United States Patent [19]

Kloss

[11] 4,051,545
[45] Sept. 27, 1977

[54] APPARATUS FOR OVERVOLTAGE PROTECTION OF A DIRECT CONVERTER IN THE ROTOR CIRCUIT OF AN ASYNCHRONOUS MACHINE

[75] Inventor: Albert Kloss, Nussbaumen, Switzerland

[73] Assignee: BBC Brown Boveri & Company Limited, Baden, Switzerland

[21] Appl. No.: 646,979

[22] Filed: Jan. 6, 1976

[30] Foreign Application Priority Data

Jan. 16, 1975  Switzerland ............... 523/75

[51] Int. Cl.$^2$ ........................................ H02H 7/122
[52] U.S. Cl. ........................ 361/58; 323/81; 361/56; 361/111; 363/53
[58] Field of Search ............... 317/20, 16, 49, 50, 317/31, 33 SC; 321/11, 14; 307/52, 62; 323/81

[56] References Cited
U.S. PATENT DOCUMENTS

| | | | |
|---|---|---|---|
| 2,948,843 | 8/1960 | Klein | 317/16 X |
| 3,213,349 | 10/1965 | Gutzwiller | 317/20 X |
| 3,555,361 | 1/1971 | Hallberg | 317/20 |
| 3,711,759 | 1/1973 | Krauthamer | 321/14 |
| 3,886,432 | 5/1975 | Piccone et al. | 321/11 |

Primary Examiner—J D Miller
Assistant Examiner—Patrick R. Salce
Attorney, Agent, or Firm—Pierce, Scheffler & Parker

[57] ABSTRACT

Apparatus for overvoltage protection of a direct converter utilizing controllable semi-conductor valves and whose output is connected to the rotor circuit of an asynchronous electrical machine includes a stepped impedance circuit which is controlled by a stepped current valve switching circuit. The stepped impedance circuit is connected to the output terminals of the converter and the valves of the switching circuit are controlled in accordance with the amplitude of any transient overvoltage induced in the rotor circuit in such manner that the total resistance value of the impedance circuit varies inversely with the amplitude of the overvoltage. The impedance switchable into and out of the circuit can be arranged in series, or in parallel, or in series-parallel.

6 Claims, 7 Drawing Figures

PRIOR ART

APPARATUS FOR OVERVOLTAGE PROTECTION OF A DIRECT CONVERTER IN THE ROTOR CIRCUIT OF AN ASYNCHRONOUS MACHINE

This invention concerns an improvement in apparatus for overvoltage protection, preferably of a direct converter, in the rotor circuit of an asynchronous machine by use of a resistor which can be added by means of an electronic switch.

Direct converters can be used with advantage to supply the rotor circuit of an asynchronous machine for its speed and output control. A typical application of use for such direct converter on the rotor side occurs in the case of a static cascade of a system-linking transformer group, connecting a three-phase system of 50 Hz with the single-phase system of 16⅔ Hz. The direct converter consists usually of three multiphase bridge assemblies connected in anti-parallel and equipped with controllable semi-conductor valves, such as thyristors. Since the asynchronous machine is started up by way of ohmic resistances, and since the direct converter is operationally connected only when synchronism has almost been reached, the thyristors are designed for a voltage which corresponds in magnitude to the slip frequency. Therefore, the normal operating voltage of the direct converter is very low relative to the standstill voltage of the machine. Sudden voltage changes in the stator circuit of the asynchronous machine caused for example by a short-circuit will result in energy-rich overvoltages in the rotor circuit. This overvoltage which in extreme cases can even exceed the standstill voltage of the machine will also load the thyristors. Since it is impossible for reasons of economy to design the thyristors for such high voltages, an effective protection must be activated when such overvoltages occur.

It is already known to employ an electronic shorter for a rapid protection against the energy-rich overvoltages (Technische Mitteilungen by AEG-TELEFUNKEN 63, 1973, volume 7, page 259 and "Eisenbahningenieur" 23, 1972, volume 3, page 81). The shorter consists of a resistor and two ignitrons or thyristors connected in anti-parallel, which will short circuit the converter phase concerned when the overvoltage reaches a specific value. The thyristors of the converter are thus isolated from the source of the overvoltage, and the overvoltage energy of the asynchronous machine will be dissipated in the series resistor. The voltage across the resistor, caused by the short-circuit current, must not exceed the permissible voltage of the thyristors of the converter, and it is therefore not possible to delimit freely the short-circuit current of the rotor circuit by means of the series resistor. Furthermore, the shorter also forms a shorting circuit of the converter. Since the series resistor can have a relatively small value only for the reasons give above, the magnitude of the converter current, generated upon the activation of the shorter, will become very great.

The activation of the electronic shorter, equipped with a low, constant series resistor, will protect the thyristors of the direct converter against overvoltages, but will at the same time subject the thyristors to a potentially high excess current. In such case the rotor of the asynchronous machine will likewise be subjected to a heavy current load.

It is the primary object of the invention to provide an arrangement which is free of the above discussed disadvantages of the known systems and which will lessen the possibility of system faults.

The invention solves this problem in that the apparatus for the overvoltage protection of the direct converter in the rotor circuit of an asynchronous machine is provided with a stepped current valve switching circuit, for example a stepped thyristor circuit with stepped impedances connected thereto and operated in such manner that their total voltage drop will stay below the maximum permissible value of the direct converter voltage.

It is the primary advantage of the invention that the rotor winding of the machine will be loaded in the case of the most frequently arising overvoltages with only a relatively low excess current because the stepped switching circuit will drive the impedance always to the highest possible value. The same applies to the converter which might be subjected under certain conditions to an excess current, caused by the shorter. Therefore, this arrangement will increase the service reliability and will lessen the possibility of system faults.

The steps of the stepped switching circuit can be connected in series, in parallel or in series-parallel. It is also feasible to incorporate the step elements of the stepped switching circuit into a semi-controlled single-phase bridge circuit or a three-phase bridge circuit, or into two Y-connected current valves respectively.

Preferred embodiments of the invention are illustrated in the accompanying drawings wherein.

Figure 1:
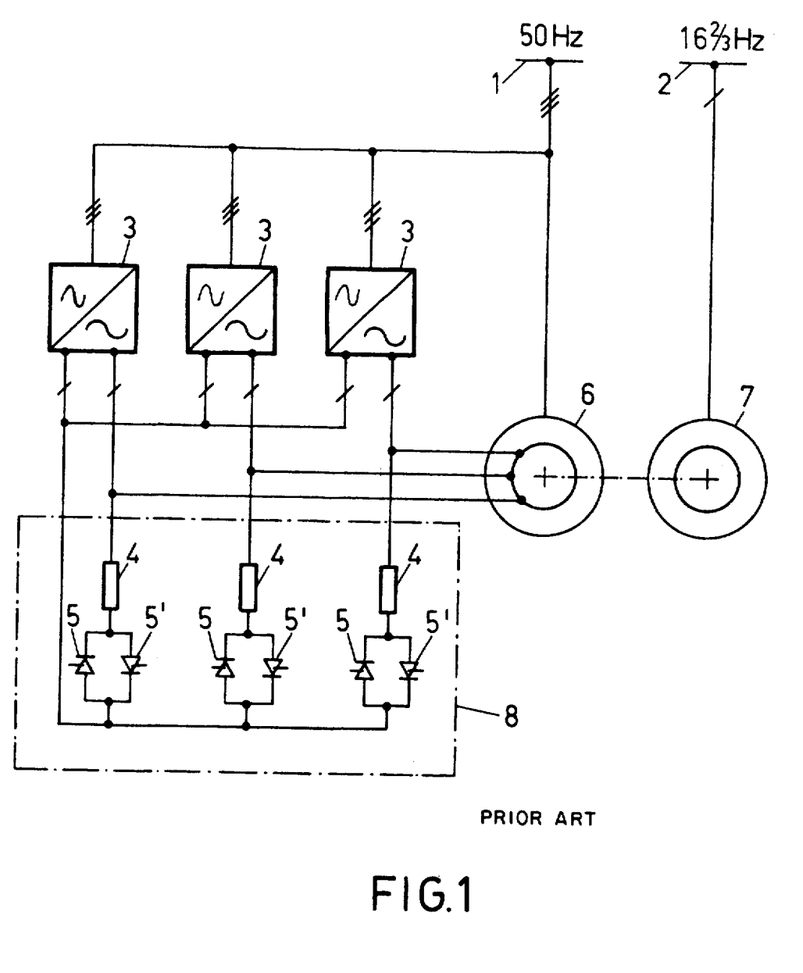
FIG. 1 shows a system representing the present state of the art.

With reference now to FIG. 1 which is illustrative of a prior art system there are denoted with numeral 1 a power system of 50 Hz, and with numeral 2 a power system of 16⅔ Hz. The three direct converters are identified by numerals 3. Series resistors are denoted by 4, ignitrons by 5 and 5', an asynchronous machine by 6 and a synchronous generator by 7. The overall shorter unit 8 is identified by the dash-dot rectangle enclosing the resistors and ignitrons.

Figure 5:
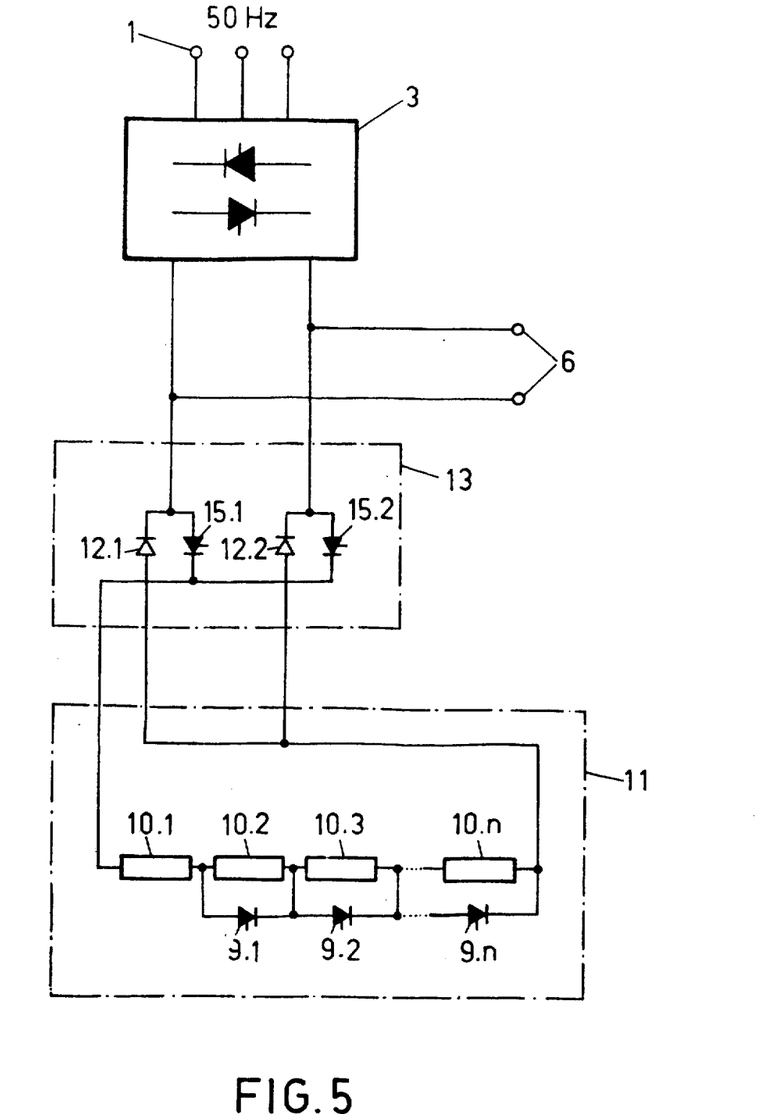
FIG. 5 shows a fourth embodiment of the invention where the step elements of the switching circuit are incorporated in a semi-controlled single-phase bridge circuit.
Figure 6:
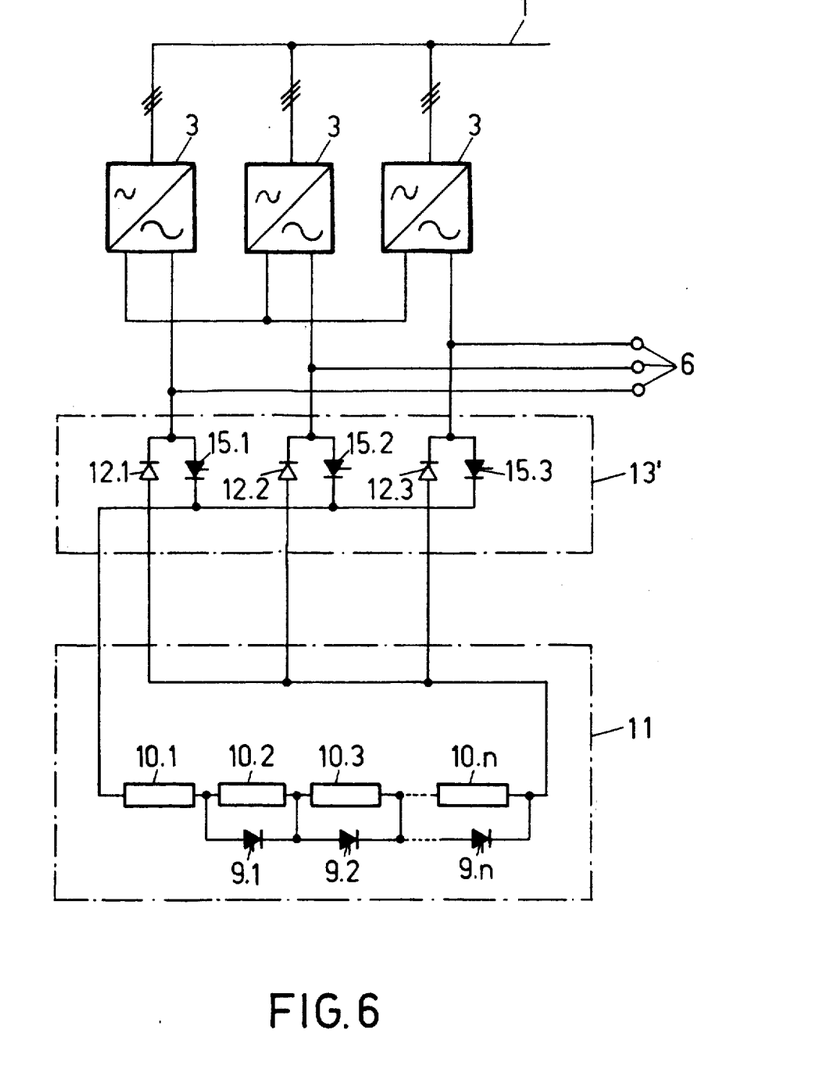
FIG. 6 shows a fifth embodiment of the invention where the step elements of the switching circuit are incorporated in a semi-controlled three-phase bridge circuit.
Figure 7:
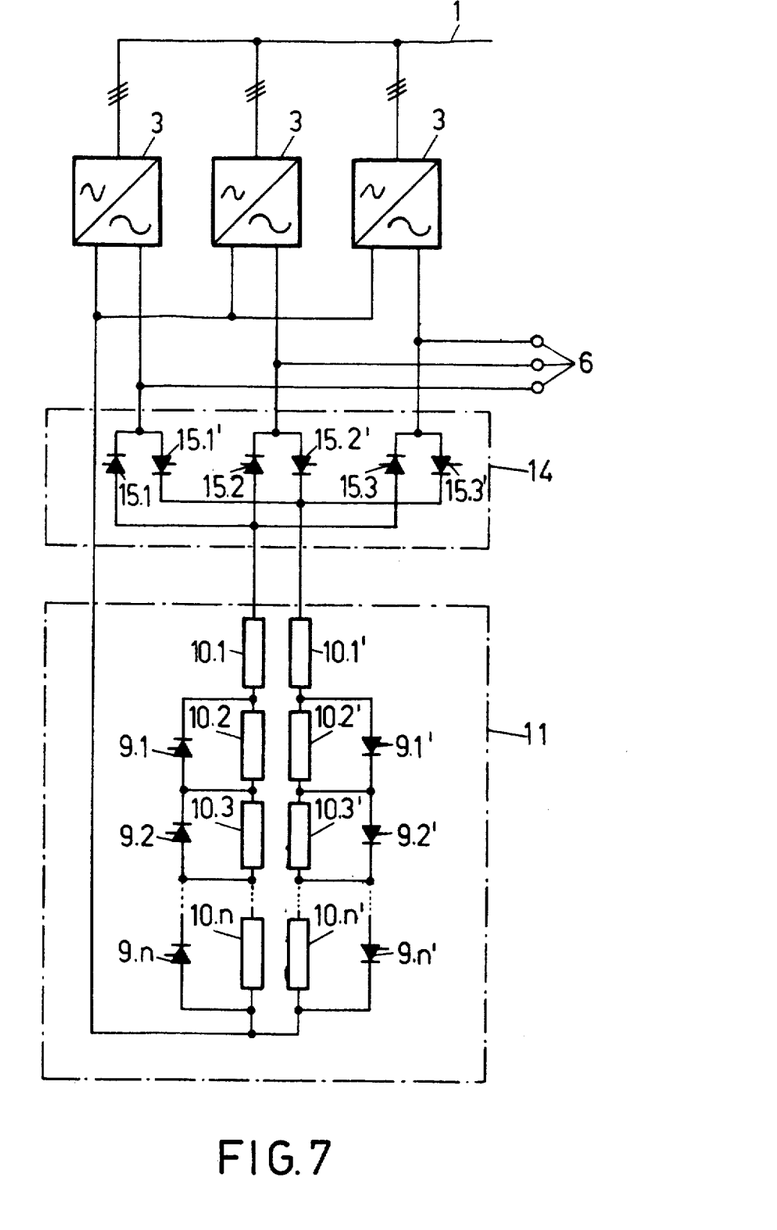
FIG. 7 shows a sixth embodiment of the invention where the step elements of the switching circuit are incorporated in two Y-connected current valve circuits.

In FIGS. 2 to 7 identical components are identified by like reference numerals. In FIGS. 2 to 7 the current valves (thyristors) are identified by reference numerals 9.1 to 9.n and 9.1' to 9.n', and the impedances (resistors) by reference numerals 10.1 to 10.n and 10.1' to 10.n'. The stepped current valve-resistor switching circuits are denoted by 11, the diodes by 12.1 to 12.3, a semi-controlled single-phase bridge circuit by 13, a semi-controlled three-phase bridge circuit by 13', and a Y-connected current valve circuit by 14. The thyristors in the circuits shown by FIGS. 6 and 7 are denoted by 15.1 to 15.3 and 15.1' to 15.3' respectively.

FIG. 1 shows a shorter 8 which represents the present state of art. It comprises, for each phase converter 3, a resistor 4 in series with two ignitrons 5 and 5', connected in anti-parallel. When the overvoltage reaches a specific level, the endangered phase of the converter is shorted so that the thyristors of the converter 3 will not be loaded by the overvoltage in the rotor circuit of the asynchronous machine 6. However, the voltage generated across the series resistor 4 must not exceed the maximum permissible voltage of the converter thyristors. This electronic shorter might under certain circumstances load the converter thyristors as well as the rotor of the asynchronous machine with a strong excess current.

Figure 2:
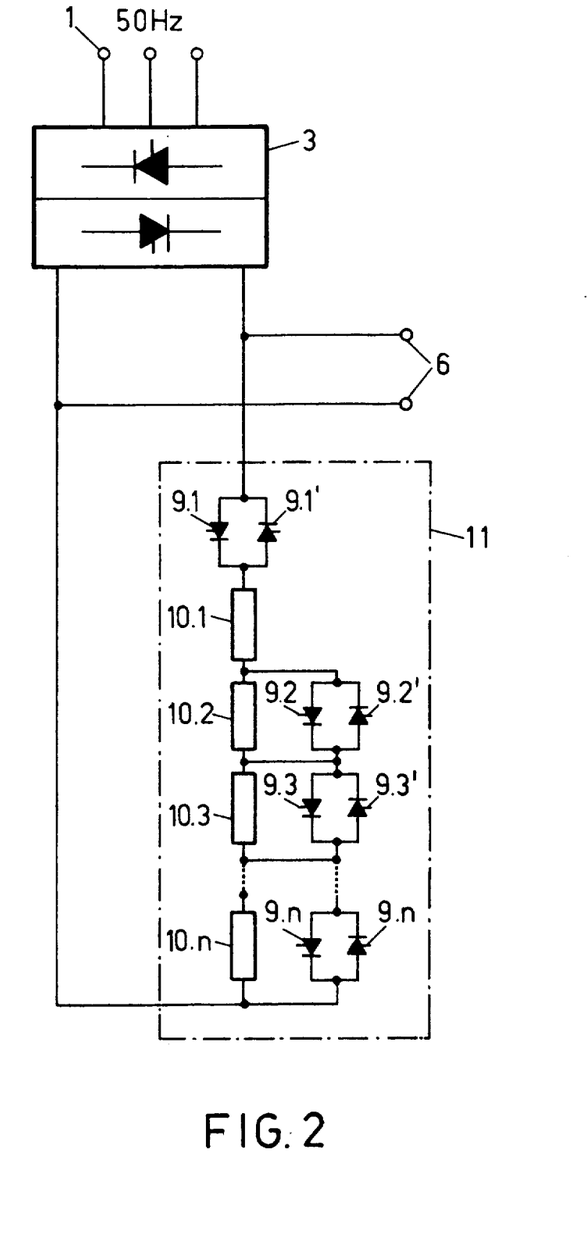
FIG. 2 shows a first embodiment of the invention, where the step elements of the switching circuit are connected in series.

In FIG. 2 there is illustrated the first embodiment of the protective device for the direct converter in the rotor circuit of the asynchronous machine in accordance with the invention. The diagram shows only one of the three phases of the direct converter. The stepped thyristor switching circuit 11 comprises $n$ anti-parallel connected thyristor groups 9.1 to 9.n and 9.1' to 9.n' and $n$ resistors 10.1 to 10.n connected in series. The stepped switching circuit 11 is connected across the low-frequency terminals of the direct converter 3. Under normal operating conditions the thyristors 9.1 to 9.n and 9.1' to 9.n' of the stepped switching circuit 11 are blocked and will therefore not influence the operations of the direct converter 3. In the event of transient phenomena within the 50 Hz system, to which the stator winding of the asynchronous machine 6 is connected, there will appear in the rotor circuit of the asynchronous machine 6 a 50 Hz voltage component, superimposed to the slip frequency, an induced overvoltage which could endanger the converter. When the overvoltage reaches the maximum permissible value, the first step (9.1, 9.1') of the stepped switching circuit is switched on. Of the two thyristors 9.1 and 9.1' it is the thyristor with the voltage in positive direction which will close the circuit. The thyristors 9.1, 9.1' are ignited either by an energizing pulse from a separate control device, or by self-igniting by way of a switching diode. Therefore, when the switching-on is accomplished, the thyristor 9.1 or 9.1' has connected parallel to the rotor of the asynchronous machine 6 and to the low frequency side of converter 3 the first resistor 10.1, the second resistor 10.2 etc. up to the last resistor 10.n. The excess current which will then form in the rotor circuit of the asynchronous machine 6, depends on the source of the overvoltage. The excess current will cause a voltage drop across the cascade of impedances, i.e. resistors (10.1 to 10.n). If this voltage is below the maximum permissible value of the converter voltage, the additional steps of the shorter switching 11 will not respond, and the transient phenomenon in the rotor circuit 6 will be damped by means of the entire cascade of these impedances. If the overvoltage becomes higher, the excess current will likewise become higher so that the voltage across the impedances could reach the maximum permissible value. In this case the second step (thyristor group 9.2, 9.2') of the switching circuit 11 will be switched on, thus reducing the total defining impedance since the second impedance (resistor) 10.2 is now shorted out by the current path through the thyristors. If the overvoltage rises still higher, the third step (9.3, 9.3') of the switching circuit 11 will be switched on, and so forth until only the first impedance 10.1 will remain in the circuit, i.e. when the overvoltage reaches its highest value. The peak value of the voltage will then correspond to the twofold peak value of the rotor standstill voltage. If the voltage across the impedances 10.1 to 10.n drops below the response threshold for the voltage of the corresponding step of the switching circuit 11, any further switching-on will cease, and the total impedance value will increase a gain in a step-by-step manner. The transient phenomena, and thus the reduction in energy will be accelerated because the time constant of the rotor circuit is held to the smallest possible value by the steps of switch circuit 11. Finally, the first step (9.1, 9.1') of the switching circuit 11 is turned off, thereby re-establishing normal operations.

The impedance graduation of the switching (shorter) circuit 11 can be selected as desired. It is possible to employ either identical thyristors, for example type BBC-CS-550-16, or several types. The stepped switching circuit 11 drives the impedance to the maximum possible value in steps, thereby preventing any excessive loads of the rotor winding of the asynchronous machine 6 and of the direct converters 3.

Figure 3:
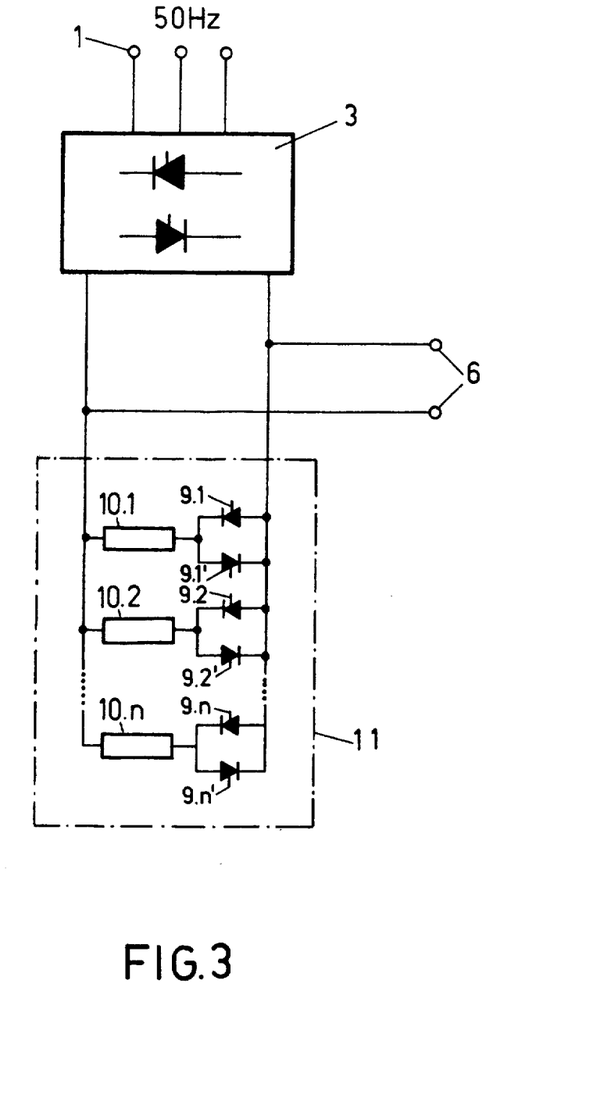
FIG. 3 shows a second embodiment of the invention where the step elements of the switching circuit are connected in parallel.
Figure 4:
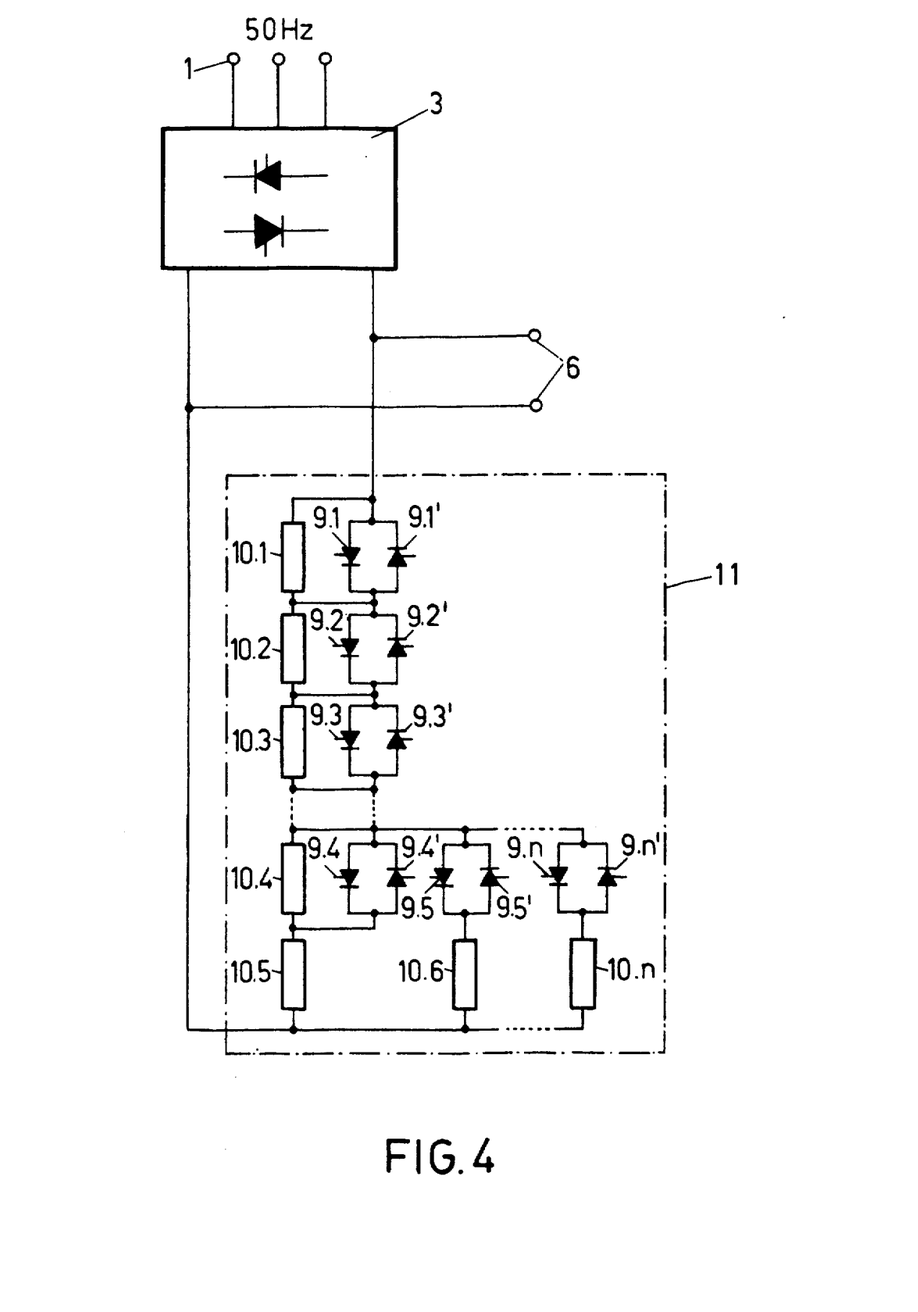
FIG. 4 shows a third embodiment of the invention where the step elements of the switching circuit are connected in series-parallel.

FIG. 3 illustrates a second embodiment of an apparatus for overvoltage protection of a direct converter in the rotor circuit of an asynchronous machine. Here again the current valves are designed in the form of thyristors 9.1 to 9.n and 9.1' to 9.n'. The resistors 10.1 to 10.n are connected in parallel with the individual groups of thyristor pairs which are connected with each other in anti-parallel. They operate in the same manner as the circuit shown by FIG. 2. The connection in parallel can also be combined with a connection in series, an arrangement illustrated in FIG. 4. The reference numerals used are identical with the reference numerals shown in FIG. 2.

FIG. 5 shows an arrangement for overvoltage protection where the step elements of the stepped thyristor switching circuit 11 are incorporated in a semi-controlled single-phase bridge circuit 13 which serves to connect the impedance circuit 11 to the output of the direct converter 3. The steps are arranged on the direct current side of the bridge valves 12.1, 12.2, 15.1, 15.2, thus reducing the number of thyristors 9.1 to 9.n.

A still greater reduction in the number of thyristors is accomplished in the case of three-phase protective circuits. FIG. 6 shows the stepped switching circuit 11 connected to the direct current side of a semi-controlled three-phase bridge circuit 13' which serves to connect the impedance circuit 11 to the output of the direct converter 3. In this case all three phases of the rotor circuit of the asynchronous machine 6 are symmetrically loaded. In the case of such arrangement only one stepped switching circuit 11 is required in contrast to the single-phase circuits (FIGS. 2 to 5) where three such circuits are needed for the full cascade.

A three-phase protective arrangement in the form of a star-connected circuit is shown by FIG. 7. Here, two sets of stepped switches 9.1 to 9.n and 9.1' to 9.n' with associated impedances 10.1 to 10.n and 10.1' to 10.n' are are incorporated in two current valve star connections 14 which serve to connect the impedance circuit 11 to the output of the star-connected direct converters 3, and individual phases of the direct converter 3 will be loaded upon activation of the switches. The impedances 10.1 to 10.n and 10.1' to 10.n' can also be a combination of resistors and condensers.

As previously indicated, the thyristors 9 in the various illustrated embodiments of the invention which determine the amount of the resistance in the circuit can be selectively ignited either by use of energizing pulses from a separate control device, or by self-ignition by means of a switching diode. A suitable separate control device, for example, could comprise an electronic, voltage-controlled pulse generator to provide positive ignition pulses at the proper times to the control electrodes of the various thyristors, these pulses being applied through a pulse transformer associated with the control electrode circuit of each thyristor. A self-ignition arrangement for the thyristors can be provided by connecting a switching diode between the anode side of each thyristor and its control electrode. Each of these switching diodes will become energized when its response voltage is exceeded, with the result that the control electrode of the thyristor will receive a positive pulse and hence cause its ignition to take place. The resistances 10.1 to 10.n and 10.1' to 10.n', and the switching diodes for the individual steps of the cascaded thyristor circuit must be selected in such manner that their response voltages are graduated so that their response will not be simultaneous. This graduation can be easily accomplished because the response voltages of the switching diodes will normally vary in a range of from 2 to 5% and can be chosen accordingly.

I claim:

1. Apparatus for overvoltage protection of a direct converter utilizing controllable semi-conductor valves and whose output is connected to the rotor circuit of an asynchronous electrical machine which comprises a stepped impedance circuit connected across the output of said direct converter, said impedance circuit being constituted by a plurality of impedance elements selectively connectible electrically in parallel, and a stepped current valve switching circuit comprising controllable semi-conductor valves connected respectively in circuit with said impedance elements, the valves of said switching circuit being controlled in accordance with the amplitude of any transient overvoltage induced in said rotor circuit such that the total resistance of said impedance circuit varies inversely with the amplitude of said overvoltage.

2. Apparatus for overvoltage protection of a direct converter utilizing controllable semi-conductor valves and whose output is connected to the rotor circuit of an asynchronous electrical machine which comprises a stepped impedance circuit connected across the output of said direct converter, said impedance circuit being constituted by a plurality of impedance elements selectively connectible electrically in series-parallel, and a stepped current valve switching circuit comprising controllable semi-conductor valves connected respectively in circuit with said impedance elements, the valves of said switching circuit being controlled in accordance with the amplitude of any transient overvoltage induced in said rotor circuit such that the total resistance of said impedance circuit varies inversely with the amplitude of said overvoltage.

3. Apparatus for overvoltage protection of a direct converter utilizing controllable semi-conductor valves and whose output is connected to the rotor circuit of an asynchronous electrical machine which comprises a stepped impedance circuit constituted by a plurality of impedance elements, a stepped current valve switching circuit comprising controllable semi-conductor valves correlated respectively with said impedance elements, the valves of said switching circuit being selectively controlled in accordance with the amplitude of any transient overvoltage induced in said rotor circuit such that the total resistance of said impedance circuit varies inversely with the amplitude of said overvoltage, and a controllable semi-conductor valve circuit connected intermediate said stepped impedance circuit and the output of said direct converter.

4. Apparatus as defined in claim 3 for overvoltage protection of single-phase direct converter wherein said intermediately connected controllable semi-conductor valve circuit is constituted by a single phase bridge circuit.

5. Apparatus as defined in claim 3 for overvoltage protection of a three-phase direct converter wherein said intermediately connected controllable semi-conductor valve circuit is constituted by a three-phase bridge circuit.

6. Apparatus as defined in claim 3 for overvoltage protection of a star connected three-phase direct converter wherein said intermediately connected controllable semi-conductor valve circuit is constituted by two current valve star connections.

* * * * *